United States Patent
Carpenter et al.

(10) Patent No.: US 10,825,595 B2
(45) Date of Patent: Nov. 3, 2020

(54) SOLENOID DAMPENING DURING NON-ACTIVE OPERATION

(71) Applicant: Hamilton Sundstrand Corporation, Charlotte, NC (US)

(72) Inventors: Richard J. Carpenter, Gales Ferry, CT (US); Russell P. Rourke, East Granby, CT (US); Lubomir A. Ribarov, West Hartford, CT (US); Jack Sisson, Ashburnham, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 234 days.

(21) Appl. No.: 16/028,643

(22) Filed: Jul. 6, 2018

(65) Prior Publication Data
US 2020/0013532 A1 Jan. 9, 2020

(51) Int. Cl.
*H01F 1/00* (2006.01)
*H01F 7/08* (2006.01)
*H01F 7/18* (2006.01)

(52) U.S. Cl.
CPC .............. *H01F 7/088* (2013.01); *H01F 7/18* (2013.01)

(58) Field of Classification Search
CPC .............. H01F 7/08; H01F 7/088; H01F 7/18
USPC ........................................................ 335/219
See application file for complete search history.

(56) References Cited

U.S. PATENT DOCUMENTS

| | | | | |
|---|---|---|---|---|
| 2,884,573 A | * | 4/1959 | Watson | F16C 29/04 335/228 |
| 3,179,859 A | * | 4/1965 | Biggle | H01F 7/1638 335/248 |
| 3,643,193 A | * | 2/1972 | Prouty | H01F 7/088 335/240 |
| 3,943,476 A | * | 3/1976 | Iyeta | H01F 7/1607 335/239 |
| 4,200,401 A | * | 4/1980 | Roy | B41J 2/285 101/93.05 |
| 4,216,454 A | * | 8/1980 | Ohtani | H01F 7/1607 335/236 |
| 4,253,603 A | * | 3/1981 | Johnson | F02C 9/28 137/85 |

(Continued)

FOREIGN PATENT DOCUMENTS

WO    2010141241    12/2010

OTHER PUBLICATIONS

The Extended European Search Report for EP Application No. 19184659.1, dated Dec. 12, 2019.

*Primary Examiner* — Shawki S Ismail
*Assistant Examiner* — Lisa N Homza
(74) *Attorney, Agent, or Firm* — Carlson, Gaskey & Olds, P.C.

(57) ABSTRACT

An electro-mechanical system has a solenoid with a plunger received in a housing chamber. A plunger portion extends outwardly of the housing. There is at least one coil, and a control for the at least one coil. The control selectively applies a first higher level current to the coil to move the plunger to an actuated position relative to the housing. The control is operable to stop the supply of first high level current to the at least one coil and allow the plunger to move to an un-actuated position. The control is operable to supply a partial power current to the at least one coil when in said un-actuated position to resist movement of the plunger. A method is also disclosed.

20 Claims, 2 Drawing Sheets

(56) References Cited

U.S. PATENT DOCUMENTS

| | | | | |
|---|---|---|---|---|
| 4,267,897 A * | 5/1981 | Takeshima | H01F 7/13 | 180/423 |
| 4,272,748 A * | 6/1981 | Fugate | H01F 7/088 | 335/271 |
| 4,458,289 A * | 7/1984 | Lukasczyk | H01F 7/18 | 251/129.08 |
| 4,458,713 A * | 7/1984 | Wernberg | F02C 7/232 | 137/115.1 |
| 4,477,789 A * | 10/1984 | Karlow | H01F 7/088 | 335/248 |
| RE31,813 E * | 1/1985 | Fugate | H01F 7/088 | 335/271 |
| 4,709,619 A * | 12/1987 | Bartholomaus | H01F 7/1607 | 251/129.03 |
| 4,908,593 A * | 3/1990 | Takayanagi | H01F 5/04 | 335/255 |
| 4,925,157 A * | 5/1990 | Troy | H01F 7/08 | 251/129.15 |
| 5,014,667 A * | 5/1991 | Meyer | F02D 11/10 | 123/360 |
| 5,128,826 A * | 7/1992 | Yoneshige | H01F 7/18 | 251/129.09 |
| 5,238,202 A * | 8/1993 | Sheehan | B65H 59/225 | 242/150 M |
| 5,300,908 A * | 4/1994 | Stone | H01F 7/088 | 335/236 |
| 5,710,532 A * | 1/1998 | Morgan | A63F 7/3075 | 335/239 |
| 5,886,607 A * | 3/1999 | Ricker | H01F 7/1607 | 335/251 |
| 5,903,203 A * | 5/1999 | Elenbaas | H01H 51/28 | 335/179 |
| 6,229,421 B1 * | 5/2001 | Floyd | H01F 7/124 | 335/229 |
| 6,512,435 B2 * | 1/2003 | van Namen | E05B 47/00 | 335/229 |
| 6,543,744 B2 * | 4/2003 | Carrillo | F02M 25/0836 | 251/129.08 |
| 6,671,145 B2 * | 12/2003 | Germain | H01H 83/04 | 335/24 |
| 6,677,844 B1 * | 1/2004 | Gorospe | H01F 7/16 | 335/220 |
| 6,828,886 B2 * | 12/2004 | Germain | H01H 83/04 | 335/18 |
| 7,551,047 B2 * | 6/2009 | Sokolow | H01R 13/4534 | 200/43.01 |
| 2003/0137376 A1 * | 7/2003 | Czimmek | F16K 31/02 | 335/215 |
| 2005/0140477 A1 * | 6/2005 | Germain | H01H 83/04 | 335/18 |
| 2009/0128264 A1 * | 5/2009 | DiSalvo | H02H 3/338 | 335/6 |
| 2010/0097165 A1 * | 4/2010 | Schilling | H01F 7/1615 | 335/257 |
| 2013/0264415 A1 * | 10/2013 | Ribarov | B64C 25/50 | 244/50 |
| 2014/0008915 A1 * | 1/2014 | Ribarov | F03D 15/20 | 290/55 |
| 2014/0028421 A1 * | 1/2014 | Matsuo | H01F 7/127 | 335/257 |
| 2014/0191549 A1 * | 7/2014 | Hermansson | H01F 7/088 | 297/284.1 |
| 2014/0377079 A1 * | 12/2014 | Gieras | B60T 13/748 | 417/15 |
| 2016/0025015 A1 * | 1/2016 | Carpenter | F02C 9/26 | 137/398 |
| 2016/0099123 A1 * | 4/2016 | Ohda | H01H 50/74 | 335/170 |
| 2016/0349766 A1 * | 12/2016 | Ribarov | F02C 7/22 | |
| 2017/0167392 A1 * | 6/2017 | Ramos | B64D 27/12 | |
| 2017/0282101 A1 * | 10/2017 | Ribarov | B01D 35/143 | |
| 2017/0335775 A1 * | 11/2017 | Ribarov | C12Q 1/6813 | |
| 2020/0013532 A1 * | 1/2020 | Carpenter | F16K 31/0675 | |
| 2020/0051723 A1 * | 2/2020 | Mahajan | H01F 7/18 | |
| 2020/0056686 A1 * | 2/2020 | Veilleux, Jr. | F16H 25/205 | |

* cited by examiner

SOLENOID DAMPENING DURING NON-ACTIVE OPERATION

BACKGROUND

This application relates to a control for dampening vibratory effect on a solenoid while de-powered.

Solenoids are being utilized in any number of modern control environments. As known, a solenoid typically includes a plunger which is selectively exposed to magnetic forces to either drive the plunger outwardly of a housing or retract the plunger back into the housing.

The retracted position may be reached by a spring bias biasing the plunger in opposition to the powered state.

Solenoids may be associated with a valve, or other components which are to be positioned in one of two states.

There are challenges with modern solenoids. In particular, the forces they see are increasing. Thus, the size and mass of the solenoid elements has been increasing. This is undesirable.

In many environments, system vibrations may be applied into the solenoid, particularly, at the deactivated state. This can raise challenges with regard to wear, and other life limiting concerns of the solenoids.

SUMMARY

An electro-mechanical system has a solenoid with a plunger received in a housing chamber. A plunger portion extends outwardly of the housing. There is at least one coil, and a control for the at least one coil. The control selectively applies a first higher level current to the coil to move the plunger to an actuated position relative to the housing. The control is operable to stop the supply of first high level current to the at least one coil and allow the plunger to move to an un-actuated position. The control is operable to supply a partial-power current to the at least one coil when in said un-actuated position to resist movement of the plunger.

A method is also disclosed.

These and other features may be best understood from the following drawings and specification.

DETAILED DESCRIPTION

Figure 1A:
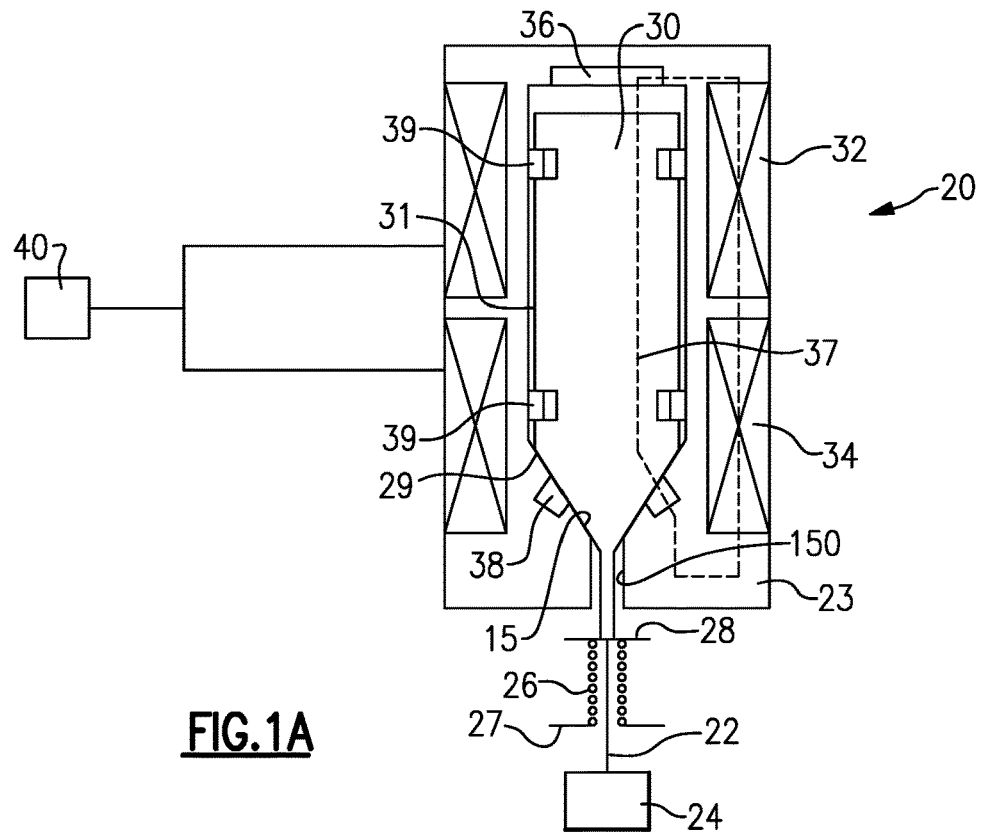
FIG. 1A shows a solenoid in a powered state.

A system 20 is illustrated in FIG. 1A in a powered position. In the powered position, a solenoid rod 22 is driven outwardly of a housing 23. With this movement, a component 24 may be actuated. In one embodiment, the component might be a valve, and in another embodiment, the component could be a mechanical component that is positioned by movement of the solenoid rod 22.

In the FIG. 1A powered position, a solenoid plunger 30 and, hence, rod 22 are driven outwardly of housing 23. The spring 26 resists this movement, such that when the solenoid is de-powered, it is returned inwardly. Spring 26 applies a force off of a ring 28 on the rod 22, and reacting off a static portion 27.

The solenoid plunger 30 is shown to have a cylindrical portion 31 leading into a frusto-conical portion 29 that extends to the rod 22. The housing 23 has a similarly shaped chamber 15 for receiving the frusto-conical portion 29. The frusto-conical portion of the plunger and chamber is at an end of the solenoid with an opening 150 through which the plunger moves.

Coils 32 and 34 selectively receive power from a control 40. Pole pieces 36 and 38 communicate with the coils 32 and 34 to apply magnetic flux 37 (shown with a dashed line) through plunger 30. This thus results in the plunger being driven outwardly of the housing 23 when powered.

Figure 1B:
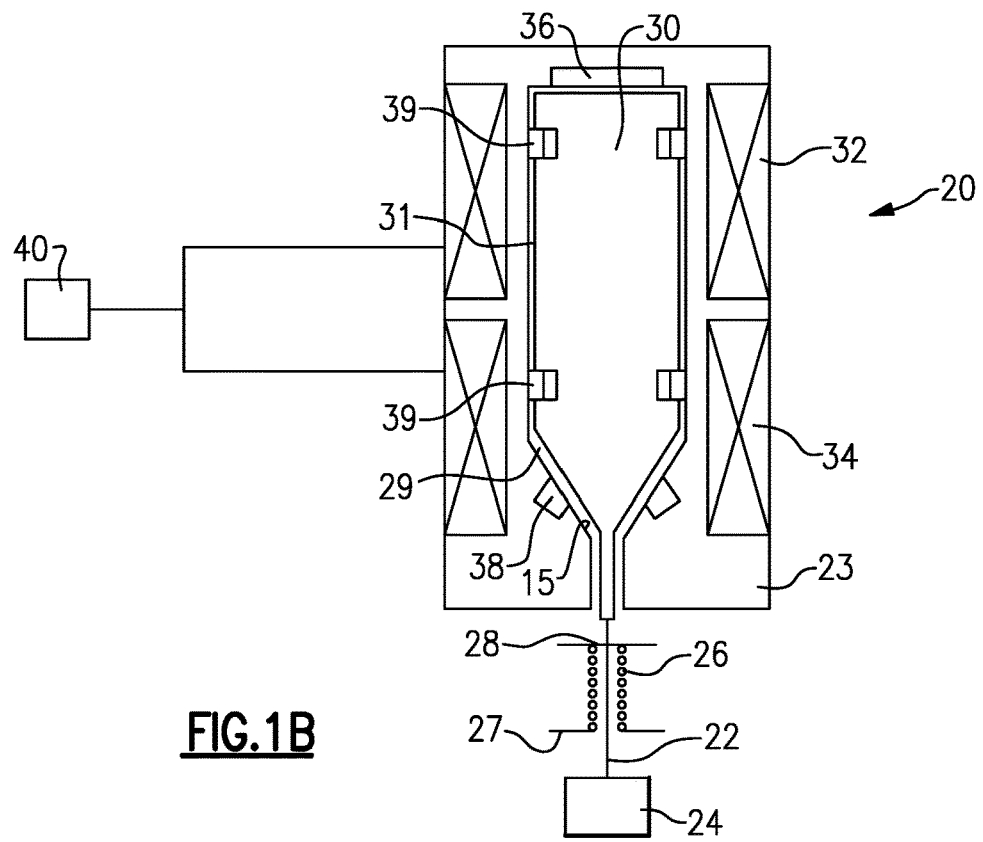
FIG. 1B shows the solenoid in a de-powered state.

As shown in FIG. 1B, the coils 32 and 34 are now de-powered by control 40 and the spring 26 has returned the plunger 30 into the housing 23. It should be understood that in other embodiments, the powered position could be drawing the plunger into the housing while a spring could bias the plunger outwardly of the housing in the de-powered. Slip rings 39 in plunger 30 guide the movement. Also powered and de-powered positions could be called actuated and un-actuated positions.

In either embodiment, there are challenges with a solenoid plunger during the de-powered state. This is particularly true when there is vibration applied to the plunger 30, such as from the component 24.

Applications can be, for example, high-temperature, high-vibratory environments associated with any gas turbine engine-mounted accessories such as values, pumps, alternators, actuators, etc. Other applications are envisioned.

Such solenoids often are in cantilevered installations, or located in areas where the vibration environment can be amplified. As such, there is specific concern for addressing vibration is an aggressive environment.

Figure 2:
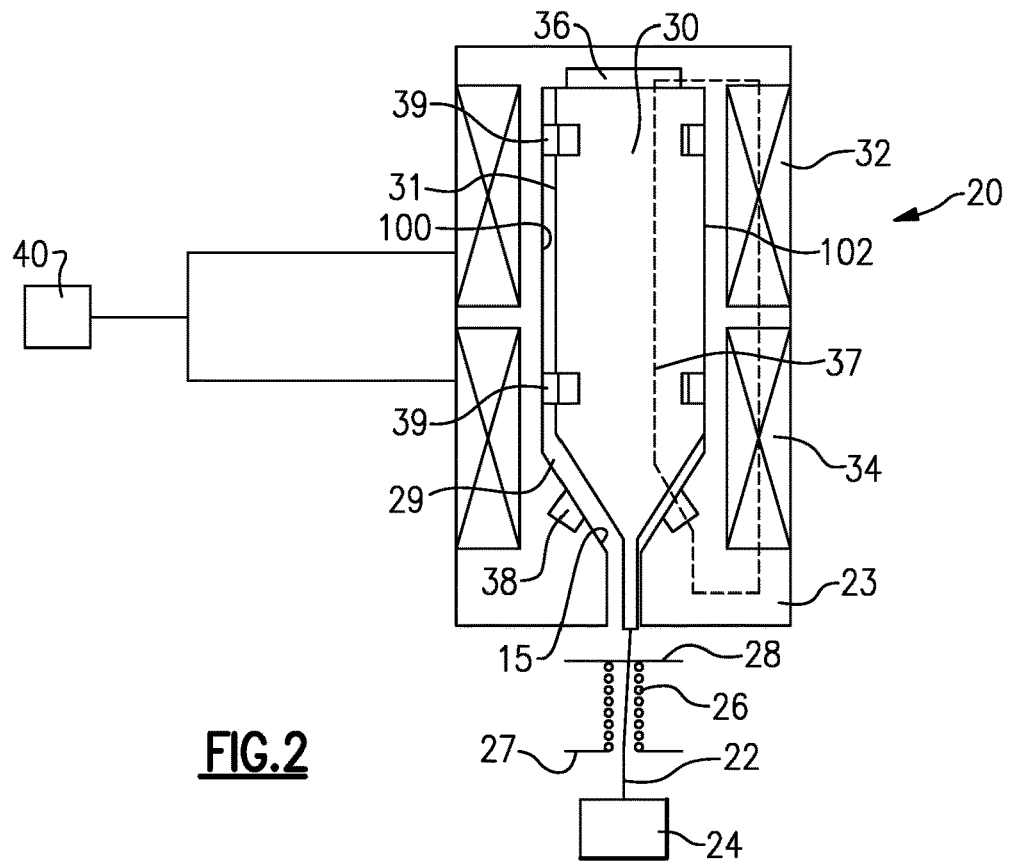
FIG. 2 shows movement reduction position in the de-powered state.

FIG. 2 shows a feature wherein the solenoid 20, in its de-powered state, is now provided with a current which is less than the powering current used to drive the solenoid to the FIG. 1A position. However, even in this de-powered state, the solenoid plunger 30 is attracted by the magnetic force from the less current. This causes a side load holding the plunger 30 against an inner wall 100 of the housing 23, such as shown at 102. This dampens vibrations and, as a result, reduces associated wear on the plunger 30 and the solenoid assembly during the de-powered state.

Figure 3:
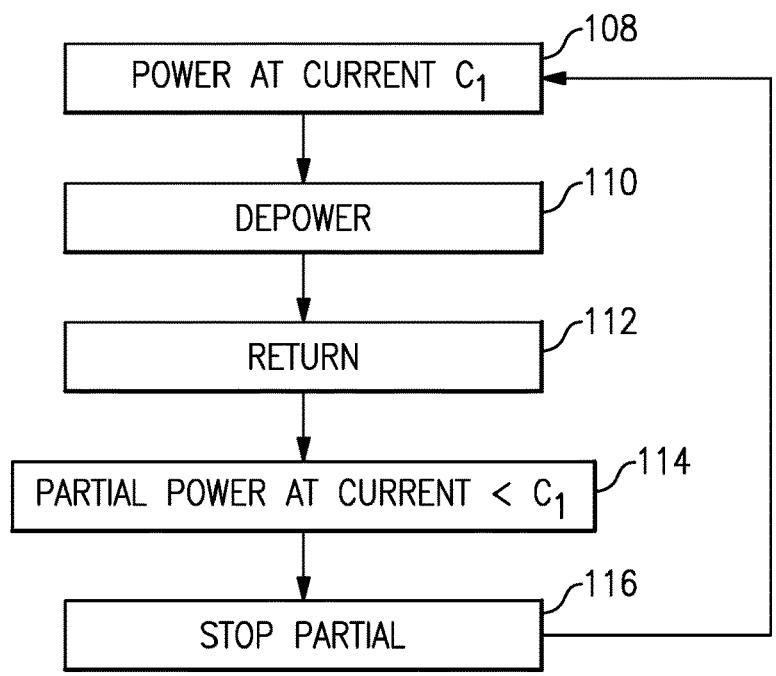
FIG. 3 is a flowchart.

FIG. 3 is a simple flowchart. At times, the solenoid is powered as shown at step 108. The powering is at a high current $C_1$.

At some point, the solenoid is de-powered as shown at step 110.

As shown at step 112, the solenoid is then returned to the de-powered position, such as shown in FIG. 1B.

The control 40 now applies a partial power to the coils at step 114. The partial power would be at some current less than $C_1$. In examples the partial current could be less than or equal to 70% of $C_1$. Also, such an embodiment may have its partial current be greater than or equal to 30% of $C_1$. Of course, valves outside either boundary are contemplated.

When one desires to repower the solenoid, the partial power is stopped at step 116 and the flow chart returns to step 108.

A mechanical system could be said to include a solenoid 20 having a plunger 30 received within a housing 23 chamber. The plunger has a portion 22 extending outwardly of the housing and connected to a component 24. There is at least one coil 32/34, and a control 40 for the at least one coil. The control selectively applies a first higher level current $C_1$ to the coil to move the plunger to a powered position relative to the housing. The control is operable to stop the supply of first high level current to the at least one coil in a de-powered position and allow the plunger to move to a de-powered position. The control is operable to apply a partial power current to the at least one coil when the at least one coil is de-powered to resist movement of the plunger. In at least one embodiment, the plunger is allowed to move to the de-powered position before the control supplies the partial power current.

A method of operating a solenoid includes the steps of selectively applying a first higher level current to a solenoid coil to move a plunger to a powered position relative to a housing and control a component. The method stops the supply of the first higher load current to the solenoid coil and allows the plunger to move towards a de-powered position. A partial power current is applied to the solenoid coil to resist movement of the plunger.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An electro-mechanical system comprising:
a solenoid having a plunger received within a housing and in a housing chamber, said plunger having a portion extending outwardly of said housing chamber and connected to a component;
at least one coil, and a control for said at least one coil, said control selectively applying a first higher level current to said coil to move said plunger to an actuated position relative to said housing chamber, and said control being operable to stop the supply of first high level current to said at least one coil in said un-actuated position and allow said plunger to move to an un-actuated position;
said control being operable to apply a partial power current to said at least one coil in an un-actuated position to resist movement of said plunger; and
said housing chamber being defined by an inner wall, and said partial power current causing a side load on said plunger, urging said plunger against an inner wall of the housing chamber.

2. The electro-mechanical system as set forth in claim 1, wherein said plunger is allowed to move to the un-actuated position before the control supplies the partial power current.

3. The electro-mechanical system as set forth in claim 2, wherein said plunger is moved outwardly of said housing chamber in said actuated position, and returned into said housing chamber in said un-actuated position.

4. The electro-mechanical system as set forth in claim 3, wherein a spring returns said plunger to said un-actuated position when the control stops supply of said current to said at least one coil.

5. The electro-mechanical system as set forth in claim 4, wherein said plunger has a cylindrical outer portion and frusto-conical portion at a side adjacent an opening to said housing chamber.

6. The electro-mechanical system as set forth in claim 2, wherein said partial power current is less than or equal to 70 percent of said powered current.

7. The electro-mechanical system as set forth in claim 6, wherein said component is a valve moving between two positions in the actuated and un-actuated positions.

8. The electro-mechanical system as set forth in claim 1, wherein a pole piece is associated with a frusto-conical portion of said housing chamber, and a second pole piece is associated with an inner end of said chamber in said housing.

9. The electro-mechanical system as set forth in claim 1, wherein said plunger is moved outwardly of said housing chamber in said actuated position, and returned into said housing chamber in said un-actuated position.

10. The electro-mechanical system as set forth in claim 9, wherein a spring returns said plunger to said un-actuated position when the control stops supply of said current to said at least one coil.

11. The electro-mechanical system as set forth in claim 1, wherein said plunger has a cylindrical outer portion and frusto-conical portion at a side adjacent an opening to said housing chamber.

12. The electro-mechanical system as set forth in claim 1, wherein said partial power current is less than or equal to 70 percent of said powered current.

13. The electro-mechanical system as set forth in claim 12, wherein said partial power current is greater than or equal to 30 percent of said powered current.

14. The electro-mechanical system as set forth in claim 1, wherein a spring returns said plunger to said un-actuated position when the control stops supply of said current to said at least one coil.

15. The method of operating a solenoid as set forth in claim 14, wherein said plunger is allowed to move to the un-actuated position before the control supplies the partial power current.

16. The method of operating a solenoid as set forth in claim 14, wherein said plunger is moved outwardly of said housing in said actuated position, and returned into said housing in said un-actuated position.

17. The method of operating a solenoid as set forth in claim 14, wherein said partial power current is less than or equal to 70 percent of said powered current.

18. The method of operating a solenoid as set forth in claim 17, wherein said partial power current is greater than or equal to 30 percent of said powered current.

19. An electro-mechanical system comprising:
a solenoid having a plunger received within a housing and in a housing chamber, said plunger having a portion extending outwardly of said housing chamber and connected to a component;
at least one coil, and a control for said at least one coil, said control selectively applying a first higher level current to said coil to move said plunger to an actuated position relative to said housing chamber, and said control being operable to stop the supply of first high level current to said at least one coil in said un-actuated position and allow said plunger to move to an un-actuated position;
said control being operable to apply a partial power current to said at least one coil in an un-actuated position to resist movement of said plunger; and
wherein said component is a valve moving between two positions in the actuated and un-actuated positions.

20. A method of operating a solenoid comprising the steps of:
(a) selectively applying a first higher level current to a solenoid coil to move a plunger to an actuated position relative to a housing and control a component, and selectively stopping the supply of current to said solenoid coil and allow said plunger to move towards an un-actuated position;
(b) applying a partial power current to said solenoid coil to resist movement of said plunger; and said housing chamber being defined by an inner wall, and said partial power current causing a side load on said plunger, urging said plunger against an inner wall of the housing chamber.

* * * * *